June 9, 1959  P. N. LEHR  2,890,311
THERMAL SENSING UNIT
Filed Oct. 31, 1956

INVENTOR.
PHILIP N. LEHR
BY
his ATTORNEYS.

2,890,311

THERMAL SENSING UNIT

Philip N. Lehr, Huntington, N.Y., assignor to Dictograph Products Company, Inc., Jamaica, N.Y., a corporation of Delaware Application October 31, 1956, Serial No. 619,498

9 Claims. (Cl. 200—138)

This invention relates to thermal sensing units for providing an output action upon the occurrence of a predetermined temperature.

Thermal sensing units, particularly those adapted for use as the sensing element in fire alarm systems or the like should, for maximum utility, be fast acting so that their operation coincides as closely as possible with actual temperature conditions. Consistent with swift action, however, the units must be accurate within close limits so that they will not operate at other than the precise intended temperatures of operation. Also, because the thermal sensing units must in many cases be conspicuously located, minimum size is desirable as well as robust construction capable of withstanding abuse without substantial loss of accuracy. Many of these desired features have been attainable in the past only by compromising other design features. For example, improved response characteristics often require greater exposure of working parts.

In accordance with the present invention, therefore, there is provided a thermal sensing element which embodies in its design characteristics each of the features of fast action, accurate calibration, minimum size and maximum durability, while at the same time providing for full protection, even to the extent of water tight sealing, of the working parts. To this end, the present invention contemplates a bimetallic strip element supported for flexing movement relative to a reference point. The strip element in its normal position is prebent relative to the reference and a thermal conducting shield such for example as a sheet metal casing is fitted over the strip to engage its surface and impose a mechanical bias thereon. In this fashion, firm although separable contact is established between the casing and the strip element which serves to facilitate calibration of the unit as well as stabilization of the established calibration and water tight sealing of the unit. Under the influence of rising or falling temperatures, depending on the use to which the unit is to be put, the bias bimetallic strip element arches over its length while its free end moves relative to the reference point. All the while, the element remains in contact with the thermal conducting casing, thereby augmenting the transfer of heat between the element and the atmosphere, with the point of contact travelling along the length of the element as its curvature changes until such time as output action obtains.

A representative embodiment of the invention from which the above and other features will be readily understood is described below having reference to the accompanying drawing in which.

Figure 1:
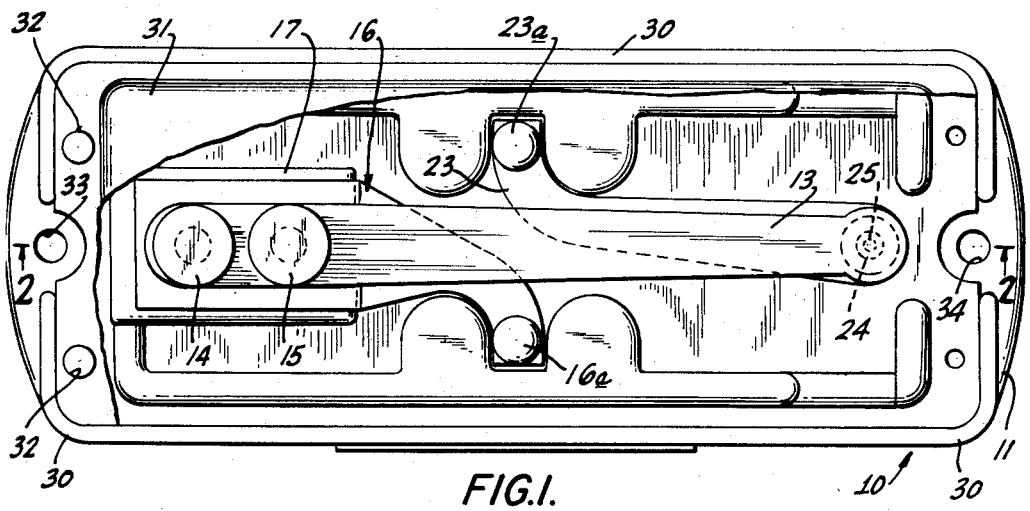
Figure 1 is a full surface view of a thermal sensing element with its cover portion partly broken away to reveal operating components therebeneath.

Referring to the drawing, the invention is illustrated as embodied in a thermal sensing unit 10 which is particularly adapted to respond to a predetermined temperature above normal to initiate the operation of a given system such for example as a fire alarm system (not shown). It should be understood, however, that the unit can also be made to respond to various other temperature conditions including temperatures below normal. The sensing element 10 includes a base 11 which is preferably formed of an electrically insulating material such as plastic or Bakelite. The base 11 includes a mounting pedestal 12 adjacent one end to which a sensing element in the form of a bimetallic strip 13 is mounted in cantilever fashion by means for example of rivets 14 and 15. The cantilever mounting includes a clamp spring pile assembly including, working upwardly from the top surface of the pedestal 12, an electrically conducting terminal connector 16, an electrically conducting spacer plate 17, the sensing element 13 and the overhanging heads of the rivets 14 and 15.

Near the opposite end of the base 11 from the pedestal 12 is a contact assembly indicated generally by the numeral 18 which can include an internally threaded bushing 19 permanently seated in a hole 20 in the base 11, a contact screw 21 threaded into the bushing 19 and a lock nut 22 on the screw seated on a second terminal connector 23. The tip 24 of the contact screw 21 comprises the contact element of the contact assembly 18 and is disposed opposite a complementary contact element 25 carried by and movable on the free end of the sensing element 13, the contact 24 thus serving as a reference to which the contact 25 moves in accordance with the motion of the sensing element 13.

The two terminal connector elements 16 and 23 are brought to the center of the base 11 and secured through rivets 16a and 23a, respectively, to terminal elements in the form of binder posts 26 and 27, respectively, to which connecting leads can be fastened to connect the unit 10 in a given system. Suitable insulating flange portions 28 and 29 are formed integrally with the base 11 to partially shield the binder posts 26 and 27 and facilitate connection of the electrical leads.

Around its upper perimeter the base 11 is formed with a ridge or bead 30 within which is seated a shallow, dished cover portion 31 secured in place as by rivets 32 and preferably forming a water tight seal. The cover portion 31 is made of a material having good thermal conductivity such for example as sheet metal which can, if appearance is not critical, be painted to provide surfaces which absorb radiant energy. The inner surface of the casing, which is preferably clean metal where it engages the upper surface of the sensing element 13, engages the element in a line of contact across its width. The sensing element 13, carrying on electrical contact and being electrically conducting to complete an electrical circuit within the unit between the binding post terminals 26 and 27 will, when direct metal to metal contact is used, connect the casing 31 to the electrical circuit. Accordingly, the casing is electrically insulated from other parts of the unit, particularly the contact assembly 18. In the event the grounded system is used, it will be understood that the grounded wire would normally be connected to the binding post terminal 26 so that the casing will remain at ground potential. However, it is not essential to the operation of the unit that a grounded system be used.

The unit can be mounted on a wall or other supporting surface by means of mounting holes 33 and 34 at either end of the base 11. The unit can be mounted without supplementary shielding, in which case it presents a relatively low silhouette, although it will be understood that if desired for any purpose it can be shielded by a supplemental cover preferably perforate for free flow of air and direct radiation to or from the casing 31.

Figure 3A:
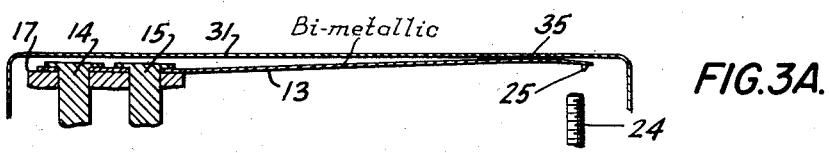
Figures 3A, 3B and 3C are diagrammatic figures showing sequentially the complementary action of the thermal conducting casing and the sensing element of the unit of Figures 1 and 2 throughout a cycle of operation.
Figure 3B:
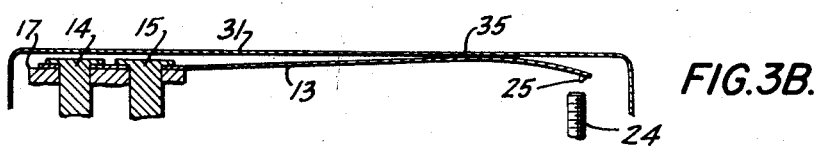
Figure 3C:
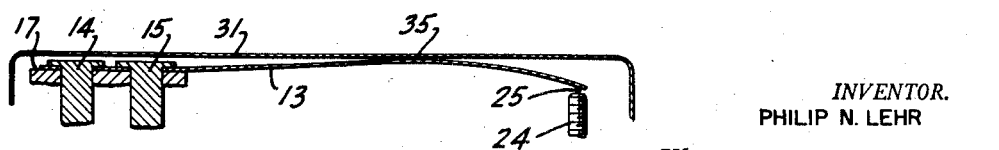

A typical operating cycle of a unit as well as its principle of operation are illustrated by the diagrammatic Figures 3A, 3B and 3C. Figure 3A illustrates the relationship between the two contact elements 24 and 25 and between the casing 31 and the sensing element 13 at a normal or reference temperature, such for example as 75° F. At this temperature, the line contact 35 between the sensing element 13 and the casing 31 occurs adjacent the tip of the element. With rising temperature, the element 13 arches convexly as seen from beneath, with the line contact 35 shifting toward the pedestal support at the secured end of the element and with the contact 25 moving toward the reference or stationary contact 24 as shown in Figure 3B. In Figure 3C, the predetermined temperature having been reached, the contacts 24 and 25 are in engagement, the line of contact 35 meantime moving further toward the pedestal support 12. It will be understood that the progress of the line of contact 35 from the free end or tip of the element toward its support is continuous. In this fashion, a maximum amount of heat is transferred to the sensing element throughout the cycle of operation by direct contact with the exposed casing. A certain amount of heat will also find its way to the element 13 by the heating of the air around the element through the casing. The latter mode of heating can be enhanced, if desired, by providing vent holes in the side of the casing, although in general it is preferred to provide the imperforate water tightly sealed casing which the present invention facilitates.

Figure 2:
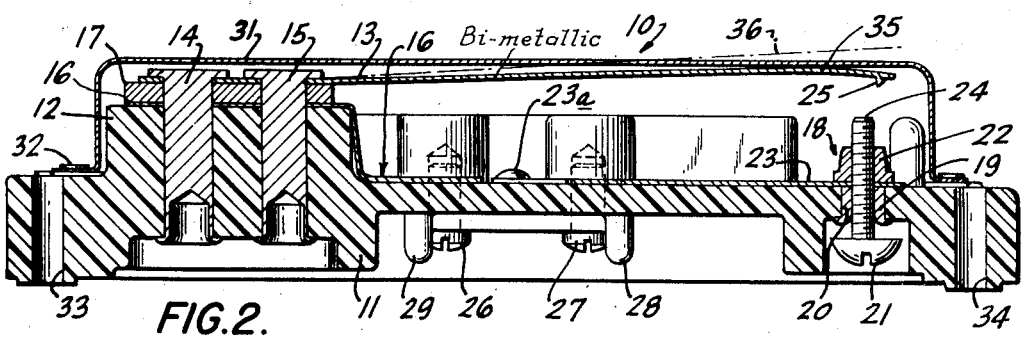
Figure 2 is a view in vertical section taken on the line 2—2 of Figure 1 looking in the direction of the arrows.

In order to set the unit for operation, the casing 31 is removed and the sensing element prebent adjacent its support or root end away from the reference contact 24 so that it would normally extend beyond the confines of the casing as illustrated by the dot-dash line 36 extending above the casing in Figure 2. When the cover is in place, the sensing element is restrained or biased to a degree dependent on the angle of prebending. Different temperature radiations for the unit can be accomplished by changing the prebent angle, i.e., the angle the element forms with the base when the cover is removed, with higher ratings resulting from larger angles. In this connection, it will be understood that the final adjustment to close tolerance of the unit is obtained through adjustment of the contact screw 21 moving the contact 24 toward or away from the contact 25. For purposes of major adjustment, different length contact screws can be used, changing the basic distance of travel of the bimetallic element.

Because the sensing element 13 is biased inwardly and because it is in continuous springing engagement with the casing, the total height of the unit is minimized, and the operating characteristics are stabilized with any desired setting for the unit being more readily attained. Moreover, regardless of the setting of the unit, the sensing member will always initially, i.e., at normal conditions, be the same distance from the reference or second contact. Thus, the space required by the working parts is the same for all settings and it is not necessary to provide space in the casing which would be waste space for all but the maximum setting. Also, unusually high sensitivity and fast action are achieved without exposing the delicate sensing element. Moreover, the relatively large surface area of the casing acts as a heat accumulator (or radiator), transferring heat by conduction to the element, which can if desired be correspondingly reduced in size.

While the invention has been described above having reference to a particular embodiment thereof, it should be understood that its principles can be embodied in other structural arrangements adapted for particular needs. For example, the fixed heat accumulating and transfer surface overlying the bimetallic strip can be made more or less sensitive to radiant energy and, if a water tight seal is not required to protect the electrical and mechanical parts from dust, corrosion and the like, more or less permeable to convection currents. Also, it need not necessarily be integral with the casing for the unit, as shown. The arrangement of the first and second complementary contacts can be varied by, for example, establishing one of the contacts adjacent the inside surface of the casing near the supported end of the bimetallic sensing strip and by establishing the movable contact on a corresponding part of the strip so that as the line of contact between the casing and the strip moves rearwardly with arching of the strip, engagement of the contacts will eventually result. Translational adjustment of the first contact lengthwise of the strip will afford a secondary adjustment of the calibration (corresponding to the adjustment of the contact screw 21) and the placement of two or more of such contacts on the inside surface of the casing spaced lengthwise of the bimetallic strip will afford a range of separate output signals. The invention should not, therefore, be regarded as limited except as defined by the following claims.

I claim:

1. In a thermal sensing device, a base, a sensing member deformable as a function of temperature, support means to mount the member on the base, first contact means mounted on the sensing member, a complementary second contact means adapted to be engaged thereby, and a fixed thermal conducting member mounted on the base and having its surface bearing on the deformable sensing member, whereby the point of contact between the sensing member and the fixed member shifts as the sensing member is deformed.

2. In a thermal sensing device, a base, a sensing member comprising a bimetallic strip deformable as a function of temperature, support means to mount the deformable bimetallic strip in cantilever fashion on the base, first contact means mounted on the sensing member, a complementary second contact means adapted to be engaged thereby, and a fixed member mounted on the base to overlie the bimetallic strip at angles thereto, the inner surface of the fixed member bearing on the deformable portion of the bimetallic strip, whereby the bimetallic strip assumes a range of curvatures in accordance with a range of temperatures and the area of contact between the fixed member and the strip shifts lengthwise of the strip.

3. A thermal sensing device as set forth in claim 2, said fixed member overlying the bimetallic strip member comprising a thermal conducting sheet of substantially greater surface area than the strip to accumulate thermal energy to be passed to the strip through physical contact with deformable portions thereof, the area of physical contact shifting along the strip as a function of temperature.

4. A thermal sensing device as set forth in claim 2, said bimetallic strip member being bendable adjacent its supported end toward and away from the fixed overlying member to vary the contact pressure therebetween, thereby to change the calibration of the unit without changing the spacing between the first and second contact means.

5. A thermal sensing device as set forth in claim 2, including means to adjust the spacing between the first and second contact means to afford further adjustment of the calibration of the unit.

6. In a thermal sensing device, a base, a sensing member comprising a bimetallic strip deformable as a function of temperature, support means to mount the deformable strip in cantilever fashion on the base, first contact means mounted on the free end of the bimetallic strip, a complementary second contact means supported by the base, and a thermal conducting casing mounted on the base and covering the bimetallic strip, said casing including an inner surface at an angle to the strip and overlying the bimetallic strip substantially along its length, said casing normally bearing against the member adjacent its free end to effect thermal conduction therebetween, said bimetallic strip upon deformation, arching to carry the first and second contact means toward each other with contact between the strip and the inner surface of the casing moving backward along the strip as it arches, thereby to maintain physical contact with the casing throughout substantially an entire cycle of operations.

7. A thermal sensing device as set forth in claim 6, said bimetallic strip being bendable adjacent its support toward or away from the opposing surface of the casing to adjust the contact pressure therebetween, thereby to adjust the calibration of the unit, and secondary adjusting means to vary the spacing between the first and second contact means.

8. A thermal sensing device as set forth in claim 6, said casing being imperforate, and means to seal the casing to the base.

9. In a thermal sensing device, a base, a sensing member deformable as a function of temperature, support means to mount the member on the base, first contact means mounted on the sensing member, a complementary second contact means adapted to be engaged thereby, and a fixed thermal conducting member mounted on the base and having its surface bearing on the deformable portions of the sensing member, whereby the point of contact between the sensing member and the fixed member shifts as the sensing member is deformed, said fixed thermal conducting member comprising an imperforate casing, and means to join said casing to the base in sealing relationship.

References Cited in the file of this patent

UNITED STATES PATENTS

| | | |
|---|---|---|
| 2,117,578 | Smith | May 17, 1938 |
| 2,257,131 | Sahli | Sept. 30, 1941 |
| 2,279,929 | Schoumaker | Apr. 14, 1942 |
| 2,310,791 | Keene | Feb. 9, 1943 |
| 2,428,838 | Derby | Oct. 14, 1947 |
| 2,767,284 | Moksu | Oct. 16, 1956 |